(12) United States Patent
Sato et al.

(10) Patent No.: US 11,402,029 B2
(45) Date of Patent: Aug. 2, 2022

(54) VALVE DEVICE, FLUID CONTROL SYSTEM, FLUID CONTROL METHOD, SEMICONDUCTOR MANUFACTURING SYSTEM, AND SEMICONDUCTOR MANUFACTURING METHOD

(71) Applicant: FUJIKIN INCORPORATED, Osaka (JP)

(72) Inventors: Tatsuhiko Sato, Osaka (JP); Tsutomu Shinohara, Osaka (JP); Tomohiro Nakata, Osaka (JP); Takeru Miura, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 400 days.

(21) Appl. No.: 16/475,931

(22) PCT Filed: Mar. 20, 2019

(86) PCT No.: PCT/JP2019/011742
§ 371 (c)(1),
(2) Date: Jul. 3, 2019

(87) PCT Pub. No.: WO2019/193978
PCT Pub. Date: Oct. 10, 2019

(65) Prior Publication Data
US 2021/0332900 A1     Oct. 28, 2021

(30) Foreign Application Priority Data

Apr. 6, 2018   (JP) .............................. JP2018-073798

(51) Int. Cl.
*F16K 17/06*        (2006.01)
(52) U.S. Cl.
CPC ................................ *F16K 17/06* (2013.01)

(58) Field of Classification Search
CPC ........................................................ F16K 7/14
(Continued)

(56) References Cited

U.S. PATENT DOCUMENTS 4,828,219 A * 5/1989 Ohmi ....................... F16K 7/14
                                                    251/118
5,215,286 A * 6/1993 Kolenc ..................... F16K 7/12
                                                    251/214
(Continued)

FOREIGN PATENT DOCUMENTS

JP    H06-193747 A    7/1994
JP    2005-172026 A   6/2005
(Continued)

OTHER PUBLICATIONS

International Search Report issued in corresponding application No. PCT/JP2019/011742 dated May 21, 2019 (6 pages).

(Continued)

*Primary Examiner* — Robert K Arundale
(74) *Attorney, Agent, or Firm* — Osha Bergman Watanabe & Burton LLP (57) ABSTRACT

A valve device includes: a valve body that forms a first flow path and a second flow path; an inner disc that includes an inner annular part disposed around an opening of the first flow path, an outer annular part disposed on an outer peripheral side of the inner annular part, and a connecting part that includes a plurality of openings that communicates with the second flow path and that connects the inner annular part and the outer annular part; a valve seat disposed on the inner annular part; and a diaphragm that, at a peripheral edge part of the diaphragm, comes into contact with the outer annular part and makes the first flow path and the second (Continued)

flow path continuous and discontinuous by moving between an open position of non-contact and a closed position of contact with the valve seat.

13 Claims, 10 Drawing Sheets

(58) Field of Classification Search
USPC .......................................................... 251/331
See application file for complete search history.

(56) References Cited

U.S. PATENT DOCUMENTS

| | | | | |
|---|---|---|---|---|
| 5,335,691 | A * | 8/1994 | Kolenc | F16K 7/12 137/312 |
| 5,485,984 | A * | 1/1996 | Itoi | F16K 7/16 251/331 |
| 6,102,071 | A * | 8/2000 | Walton | G05D 16/0641 137/540 |
| 7,150,444 | B2 * | 12/2006 | Ohmi | F16K 25/005 251/118 |
| 7,377,483 | B2 * | 5/2008 | Iwabuchi | F16K 7/16 251/331 |
| 8,251,347 | B2 * | 8/2012 | Schmit | F16K 7/16 251/331 |
| 8,960,644 | B2 * | 2/2015 | Aoyama | F16K 1/425 251/331 |
| 10,774,938 | B2 * | 9/2020 | Glime, III | F16K 7/14 |
| 2003/0025099 | A1 * | 2/2003 | Nakata | F16K 7/16 251/331 |
| 2003/0042459 | A1 * | 3/2003 | Gregoire | F16K 27/0236 251/331 |
| 2006/0214130 | A1 * | 9/2006 | Tanikawa | F16K 7/14 251/331 |
| 2014/0217321 | A1 * | 8/2014 | Glime | F16K 7/14 251/331 |
| 2014/0326915 | A1 * | 11/2014 | Kitano | F16K 7/12 251/331 |
| 2016/0178072 | A1 * | 6/2016 | Kitano | F16K 7/14 251/331 |
| 2020/0278049 | A1 * | 9/2020 | Watanabe | F16K 1/42 |
| 2020/0325887 | A1 * | 10/2020 | Watanabe | F16K 7/12 |
| 2020/0340591 | A1 * | 10/2020 | Watanabe | F16K 1/42 |
| 2020/0354835 | A1 * | 11/2020 | Watanabe | F16K 27/003 |
| 2021/0199205 | A1 * | 7/2021 | Watanabe | F16K 7/16 |

FOREIGN PATENT DOCUMENTS

| | | |
|---|---|---|
| JP | 2013-117269 A | 6/2013 |
| JP | 2016-11744 A | 1/2016 |
| JP | 2016-505125 A | 2/2016 |

OTHER PUBLICATIONS

Written Opinion of the International Searching Authority issued in corresponding application No. PCT/JP2019/011742 dated May 21, 2019 (6 pages).

* cited by examiner

VALVE DEVICE, FLUID CONTROL SYSTEM, FLUID CONTROL METHOD, SEMICONDUCTOR MANUFACTURING SYSTEM, AND SEMICONDUCTOR MANUFACTURING METHOD

TECHNICAL FIELD

The present invention relates to a valve device, a fluid control system, a fluid control method, a semiconductor manufacturing system, and a semiconductor manufacturing method.

BACKGROUND

In a semiconductor manufacturing process, for example, a valve device is used that controls a supply of various process gases to a chamber of a semiconductor manufacturing system.

In Patent Document 1, there is disclosed a diaphragm valve that comprises a retainer holding a seat holder detachably disposed on a body and holding a seat, and a retainer detachably attached to a diaphragm holding member while holding the seat holder. The retainer has a substantially cylindrical shape and includes an inward flange part that receives an outer peripheral edge part of the seat holder.

In Patent Document 2, there is disclosed another diaphragm valve. A recess of a main body of this diaphragm valve includes a large diameter part close to the opening and a small diameter part aligned below the large diameter part via a step part. A flow path forming disc is fitted to the recess. The flow path forming disc includes a large diameter cylindrical part fitted to the large diameter part of the recess, a coupling part received by the step part of the recess, and a small diameter cylindrical part including an outer diameter smaller than an inner diameter of the small diameter part of the recess and a lower end received by a bottom surface of the recess. A plurality of through holes communicating an outer annular space of the small diameter cylindrical part and an inner annular space of the large diameter cylindrical part is formed in the coupling part of the flow path forming disc. A fluid inflow passage communicates with a lower end of the small diameter cylindrical part of the flow path forming disc, and a fluid outflow passage communicates with the outer annular space of the small diameter cylindrical part.

Patent Document 1: JP 2013-117269 A
Patent Document 2: JP 2005-172026 A

For example, in an atomic layer deposition (ALD), a process gas used in a treatment process that deposits a film on a substrate needs to be supplied in a stable manner at a higher flow rate.

In light of the circumstances mentioned above, one or more embodiments of the present invention provide a valve device capable of controlling a high flow rate in a more stable manner, a fluid control system that uses this valve device, a fluid control method, a semiconductor manufacturing system, and a semiconductor manufacturing method.

SUMMARY

A valve device according to one or more embodiments includes: a valve body that forms a first flow path and a second flow path; an inner disc that includes an inner annular part disposed around an opening of the first flow path, an outer annular part disposed on an outer peripheral side of the inner annular part, and a connecting part provided with a plurality of openings communicating with the second flow path and connecting the inner annular part and the outer annular part; a valve seat disposed on the inner annular part; a diaphragm that, at a peripheral edge part thereof, comes into contact with the outer annular part, and makes the first flow path and the second flow path continuous and discontinuous by moving between an open position of non-contact and a closed position of contact with the valve seat; and a pressing adapter that sandwiches the peripheral edge part of the diaphragm with the outer annular part, and comes into contact with the peripheral edge part. An outermost position of a diaphragm contact surface of the outer annular part that comes into contact with the diaphragm is on an outer side of an innermost position of a body contact surface of the outer annular part that comes into contact with a surface of the valve body orthogonal to an axial direction.

Further, in the valve device according to one or more embodiments, the outermost position of the diaphragm contact surface may be on an outer side of an outermost position of the body contact surface.

Further, in the valve device according to one or more embodiments, the diaphragm may be a dome type in which a curve forming a curved surface in the open position has no inflection point.

Further, the valve device according to one or more embodiments may further include a disc seal disposed between the inner annular part and the valve body, and held by a disc seal recessed part formed on the valve body side of the inner annular part.

Further, in the valve device according to one or more embodiments, the inner annular part may include a valve seat recessed part formed on the diaphragm side, and the valve seat may be held by the valve seat recessed part and be made of a same material and have a same shape as the disc seal.

Further, in the valve device according to one or more embodiments, the inner annular part may have a tubular shape longer than the outer annular part in a direction of extension of a center line, an inner side of the inner annular part communicates with the first flow path, and an outer side of the inner annular part communicates with the second flow path.

A valve device according to one or more embodiments includes: a valve body that forms a first flow path and a second flow path; an inner disc that includes an inner annular part disposed around an opening of the first flow path, an outer annular part disposed on an outer peripheral side of the inner annular part, and a connecting part provided with a plurality of openings communicating with the second flow path and connecting the inner annular part and the outer annular part; a valve seat disposed on the inner annular part; a diaphragm that, at a peripheral edge part thereof, comes into contact with the outer annular part, and makes the first flow path and the second flow path continuous and discontinuous by moving between an open position of non-contact and a closed position of contact with the valve seat; and a pressing adapter that sandwiches the peripheral edge part of the diaphragm with the outer annular part, and comes into contact with the peripheral edge part. A radius of a circle formed by an outer edge of, among a surface on the diaphragm side and a surface on the valve body side formed on the outer annular part and opposite from each other, the surface on the diaphragm side is greater than a radius of a circle formed by an inner edge of the surface on the valve body side.

Further, in the valve device according to one or more embodiments, a radius of a circle formed by an outer edge of, among a surface on the diaphragm side and a surface on the valve body side, the surface on the diaphragm side may be greater than a radius of a circle formed by an outer edge of the surface of the valve body side.

A fluid control system in one or more embodiments is a fluid control system including a plurality of fluid devices arranged from an upstream side toward a downstream side and including any one of the valve devices mentioned above.

A flow control method according to one or more embodiments is a method for adjusting a flow rate of a fluid using any one of the valve devices mentioned above.

A semiconductor manufacturing system according to one or more embodiments includes any one of the valve devices mentioned above for control of the process gas in a manufacturing process of a semiconductor device that requires a treatment process by the process gas in a sealed chamber.

A semiconductor manufacturing method according to one or more embodiments includes a step of using any one of the valve devices mentioned above for flow control of the process gas in a manufacturing process of a semiconductor device that requires a treatment process by the process gas in a sealed chamber.

According to the present invention, it is possible to control a high flow rate in a more stable manner.

DETAILED DESCRIPTION

Embodiments of this disclosure are described below with reference to the drawings. In the descriptions, the same elements are denoted using the same reference signs, and duplicate descriptions are omitted as appropriate.

First, an example of a fluid control system in which the present invention is applied will be described with reference to FIG. 12.

Figure 12:
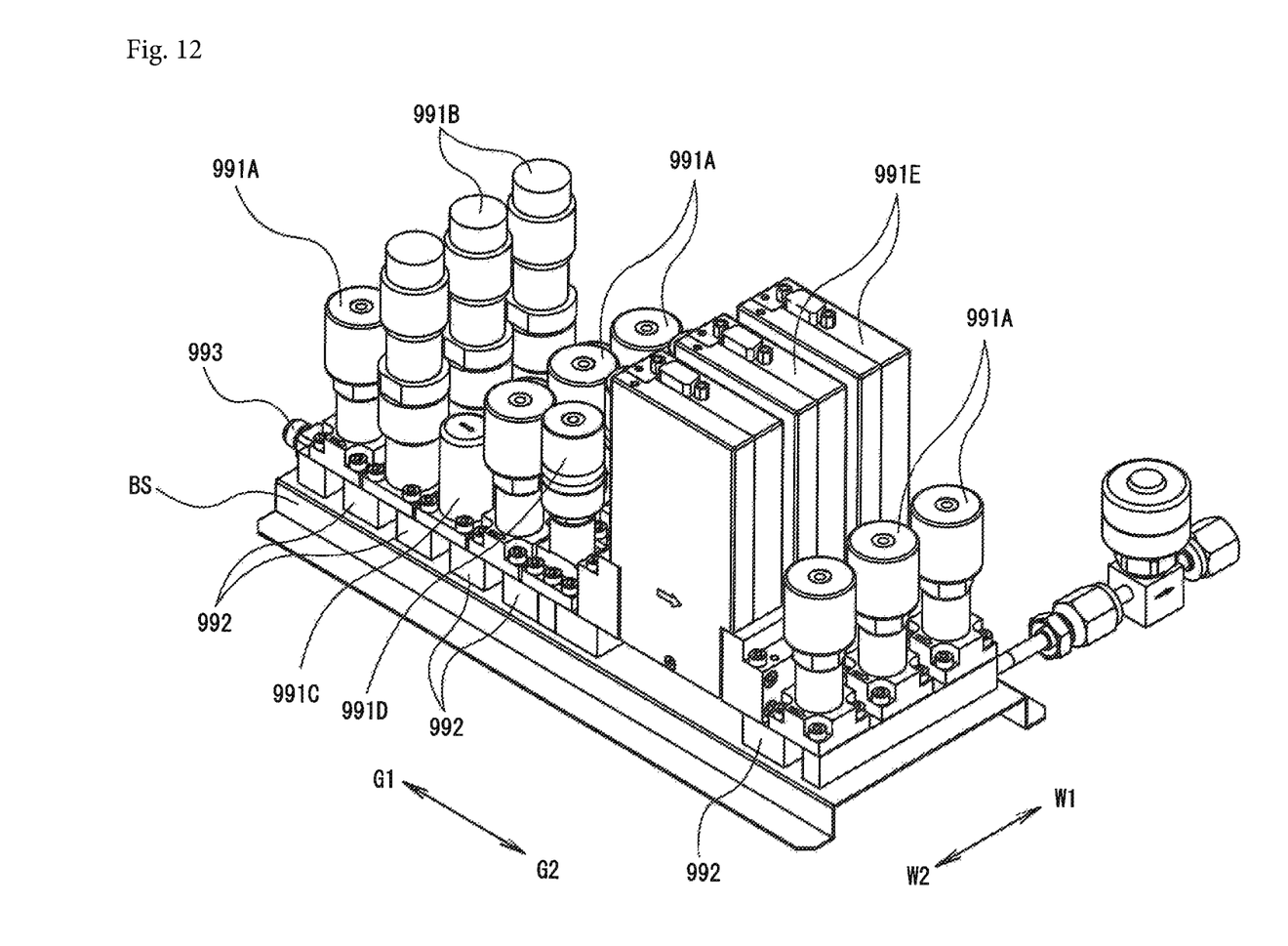
FIG. 12 is a perspective view illustrating an example of a fluid control system that uses the valve device according to one or more embodiments.

In the fluid control system illustrated in FIG. 12, there is provided a base plate BS made of metal, arranged in width directions W1, W2, and extending in longitudinal directions G1, G2. It should be noted that W1, W2, G1, and G2 denote front side, rear side, upstream side, and downstream side directions, respectively. In the base plate BS, various fluid devices 991A to 991E are installed via a plurality of flow path blocks 992, and flow paths (not illustrated) through which a fluid flows from the upstream side G1 toward the downstream side G2 are formed by the plurality of flow path blocks 992.

Here, "fluid device" is a device used in a fluid control system for controlling a flow of a fluid, comprising a body defining a fluid flow path, and provided with at least two flow path ports that open on a surface of this body. Specifically, the fluid device includes the switch valve (two-way valve) 991A, the regulator 991B, the pressure gauge 991C, the switch valve (three-way valve) 991D, the mass flow controller 991E, and the like, but is not necessarily limited thereto. It should be noted that an introducing pipe 993 is connected to each of the flow path ports on the upstream side of the flow paths (not illustrated) described above.

The present invention, while applicable to various valve devices such as the switch valves 991A, 991D, and the regulator 991B described above, will be described using a case of application to a switch valve as an example according to one or more embodiments.

Figure 1:
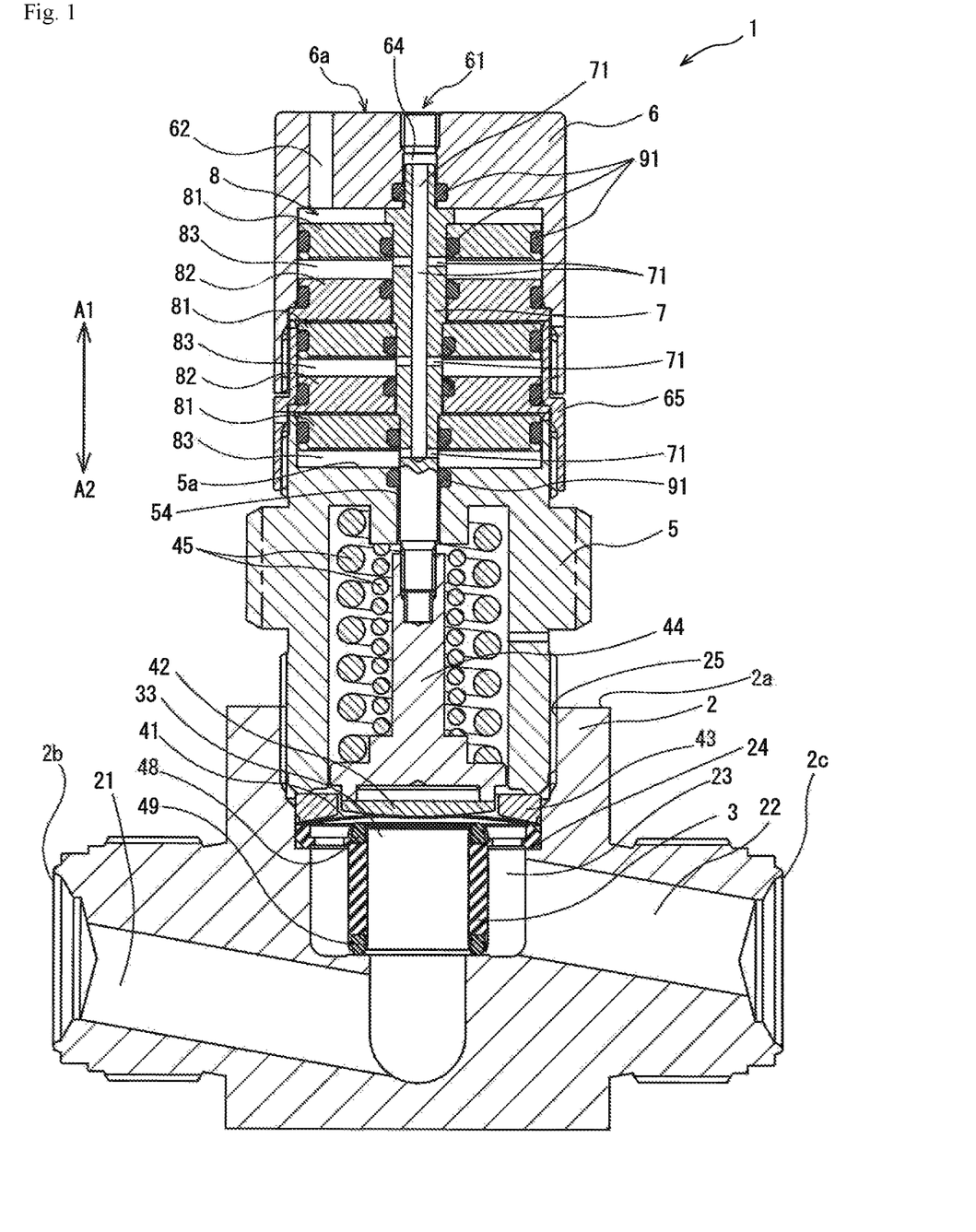
FIG. 1 is a sectional view illustrating a configuration of a valve device according to one or more embodiments of the present invention.
Figure 2:
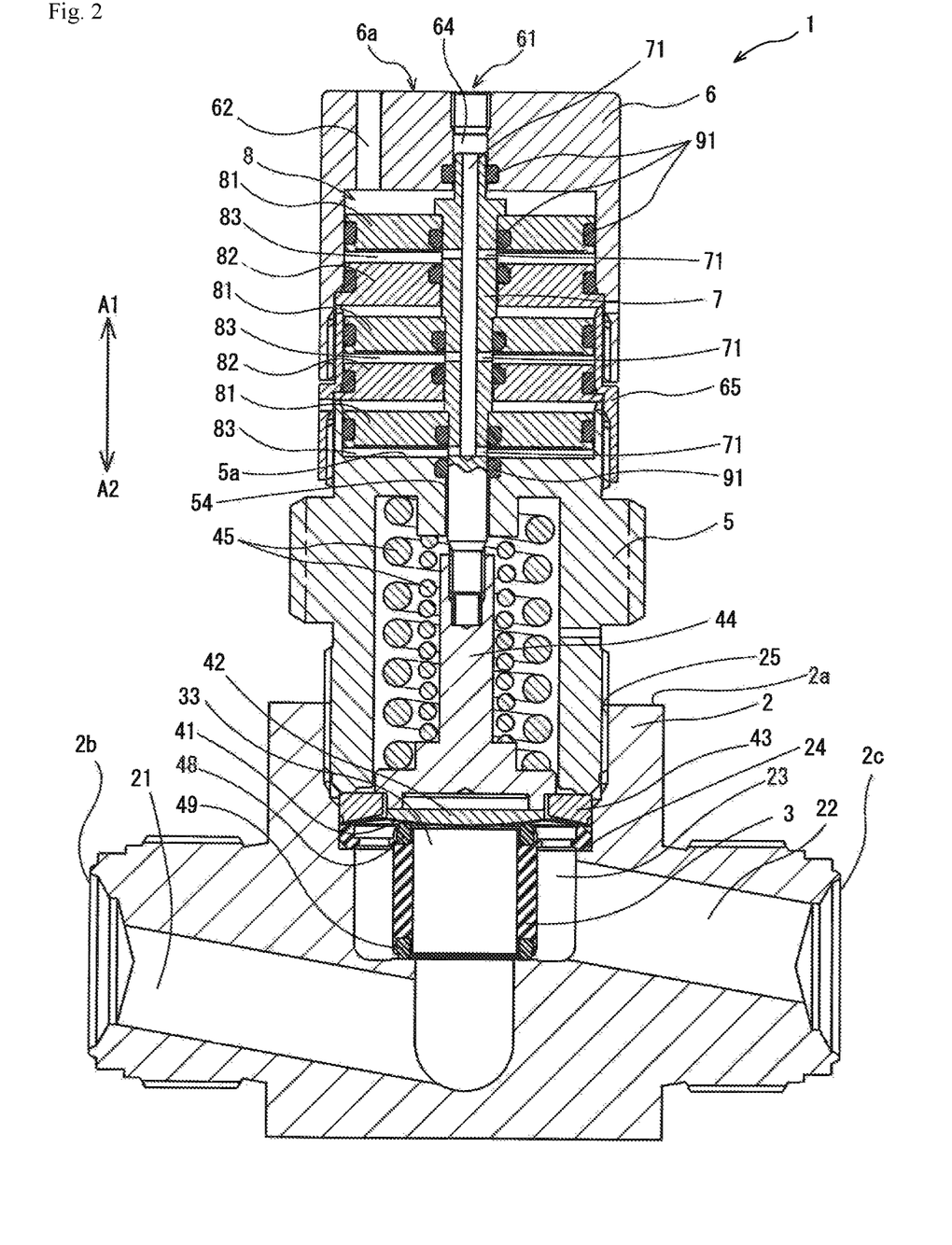
FIG. 2 is a sectional view illustrating a closed state of the valve device in FIG. 1.

FIG. 1 is a sectional view illustrating a configuration of a valve device 1 in an open state according to one or more embodiments of the present invention. FIG. 2 is a sectional view illustrating a closed state of the valve device 1 in FIG. 1. As illustrated in FIG. 1, the valve device 1 comprises a casing 6, a bonnet 5, a valve body 2, an inner disc 3, a valve seat 48, a diaphragm 41, a pressing adapter 43, a diaphragm presser 42, a stem 44, and a coil spring 45. It should be noted that arrows A1, A2 in the drawing indicate upward and downward directions, A1 being the upward direction and A2 being the downward direction.

The valve body 2 is formed from stainless steel, and includes an upper surface 2a and side surfaces 2b and 2c opposite from each other. From the upper surface 2a, a valve chamber 23 having a space in which the inner disc 3 is disposed and a step part 24 opens, and a screw hole 25 comprising a thread groove screwed with the bonnet 5 is formed. Further, the valve body 2 forms a first flow path 21 and a second flow path 22. The first flow path 21 is a flow path that opens on the side surface 2b and a bottom surface of the valve chamber 23. The second flow path 22 is a flow path that opens on the side surface 2c and a side surface of the valve chamber 23.

The diaphragm 41, at a peripheral edge part thereof, comes into contact with an outer annular part 31 of the inner disc 3 described later, and makes the first flow path 21 and the second flow path 22 continuous and discontinuous by moving between a closed position of contact and an open position of non-contact with the valve seat 48. The casing 6 incorporates an actuator 8 that drives the diaphragm 41, and is fixed on the bonnet 5 via a connecting member 65. According to one or more embodiments, the valve body 2 and the bonnet 5 are screwed into the casing 6 via the connecting member 65, but may be configured without the connecting member 65. An operating member 7 moves between a closed position and an open position in which the diaphragm 41, serving as a valve element, respectively closes and opens the opening of the first flow path 21. The operating member 7 of the actuator 8 is formed in a substantially cylindrical shape, held by an inner peripheral surface of a circular hole 54 of the bonnet 5 and an inner peripheral surface of a circular hole 64 formed inside the casing 6, and moveably supported in the upward and downward directions A1, A2. An O-ring 91 is disposed between inner peripheral surfaces of circular holes 54 and 64 and the operating member 7, securing airtightness.

In the interior of the bonnet 5, the operating member 7 is coupled with the stem 44, and the stem 44 moves along with the operating member. The stem 44, in the interior of the bonnet 5, is pressed by the coil spring 45 in the downward direction A2 relative to the bonnet 5, that is, in the direction in which the diaphragm 41 is moved to the closed position. While the coil spring 45 is used according to one or more embodiments, the present invention is not necessarily limited thereto, and other types of elastic members can be used, such as a disc spring or a leaf spring. The diaphragm presser 42 that is made of a synthetic resin such as polyimide and comes into contact with a central upper surface of the diaphragm 41 is mounted on a lower end surface of the stem 44.

In the interior of the casing 6, one or a plurality of bulkheads 82 having an annular shape is formed around the operating member 7, and one or a plurality of pistons 81 is disposed in a cylinder 83 sandwiched between an upper surface 5a of the bonnet 5 and the one or plurality of bulkheads 82. The O-ring 91 is disposed between the pistons 81 and the inner peripheral surface forming the space in the interior of the casing 6, and between the operating member 7 and the piston 81, securing airtightness.

The cylinders 83 and the pistons 81 constitute the actuator 8 that moves the operating member 7 into the open position against the coil spring 45. The actuator 8, for example, increases the area on which pressure acts by using the plurality of pistons 81, making it possible to boost the force obtained from the operation gas. A space on an upper side of the piston 81 of each of the cylinders 83 opens to the atmosphere by a ventilation path 62 or the like.

A space on a lower side of the piston 81 of each of the cylinders 83 communicates with an operating member flow channel 71 formed in the operating member 7. The operating member flow channel 71 communicates with an operation gas supply port 61 connected to the circular hole 64 formed on an upper surface 6a of the casing 6. As a result, the operation gas supplied from the operation gas supply port 61 is supplied to the cylinder 83, and the piston 81 is pushed up in the upward direction A1. It should be noted that the configurations of the casing 6, the actuator 8, the bonnet 5, the stem 44, the diaphragm presser 42, and the coil spring 45 are examples of configurations for an automatic valve device that controls the opening and closing of the valve element by compressed air, and other known configurations or the like can be selected as appropriate. Further, these configurations need not be provided in cases of a manual valve device or the like.

Figure 3:
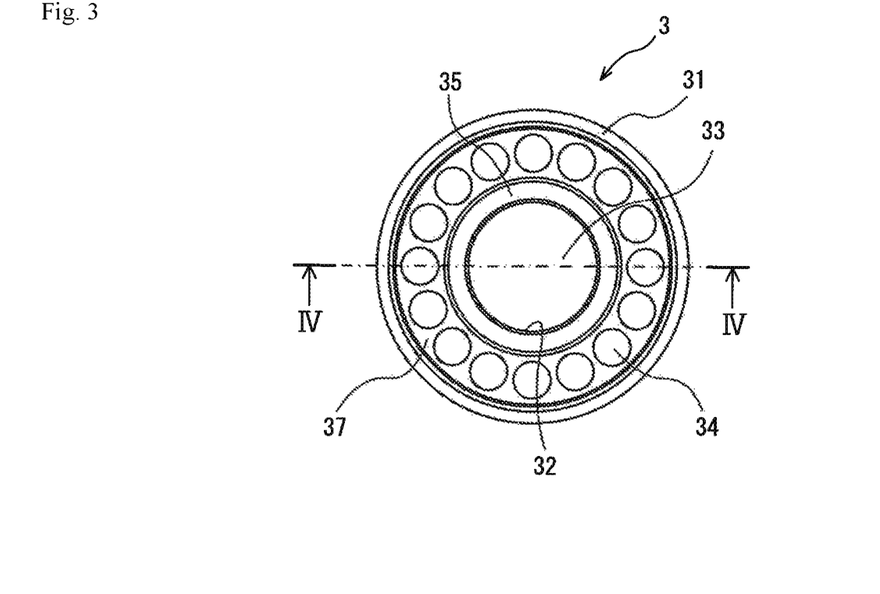
FIG. 3 is a top view of an inner disc.
Figure 4:
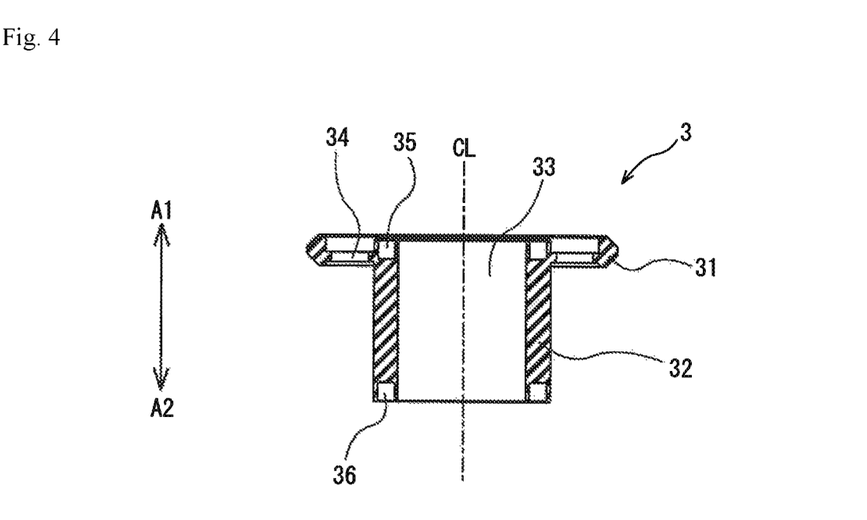
FIG. 4 is a sectional view of the inner disc along line IV-IV in FIG. 3.

The inner disc 3 is disposed in the valve chamber 23, and opens on the diaphragm 41 side while securing a seal performance of the first flow path 21 with respect to the second flow path 22. FIG. 3 is a top view of the inner disc 3. FIG. 4 is a sectional view of the inner disc 3 along line IV-IV in FIG. 3. As illustrated in these drawings, the inner disc 3 includes an inner annular part 32, the outer annular part 31, and a connecting part 37. The inner annular part 32 is disposed around the opening of the first flow path 21, and comprises a first opening 33. The outer annular part 31 has an annular shape concentric with the inner annular part 32. The connecting part 37 has a plurality of second openings 34 communicating with the second flow path 22, and connects the inner annular part 32 and the outer annular part 31. It should be noted that the outer annular part 31 is disposed on the step part 24 of the valve chamber 23.

According to one or more embodiments, the inner annular part 32 has a tubular shape longer than the outer annular part 31 in a direction of extension of a center line CL, an inner side of the inner annular part 32 communicates with the first flow path 21, and an outer side of the inner annular part 32 communicates with the second flow path 22. With such a configuration, it is possible to provide the opening of the first flow path 21 on the bottom surface of the valve chamber 23 and the opening of the second flow path 22 on the side surface of the valve chamber 23, thereby making it possible to further increase the diameters of the first flow path 21 and the second flow path 22. As a result, the flow rate in the open state can be increased. However, the configuration may be such that the valve chamber 23 has a shallow depth, and the inner annular part 32 used has about the same length as the outer annular part 31.

The valve seat 48 is disposed on the inner annular part 32. Further, the valve device 1 may further comprise a disc seal 49 disposed between the inner annular part 32 and the valve body 2. The disc seal 49 is held by a disc seal recessed part 36, which is a groove formed on the valve body 2 side of the inner annular part 32. Furthermore, the inner annular part 32 may include a valve seat recessed part 35, which is a groove formed on the diaphragm 41 side, and the valve seat 48 may be held by the valve seat recessed part 35. The disc seal 49 blocks the area between the inner side and the outer side of the inner annular part 32 on the valve body 2 side of the inner annular part 32, and secures airtightness.

Figure 5:
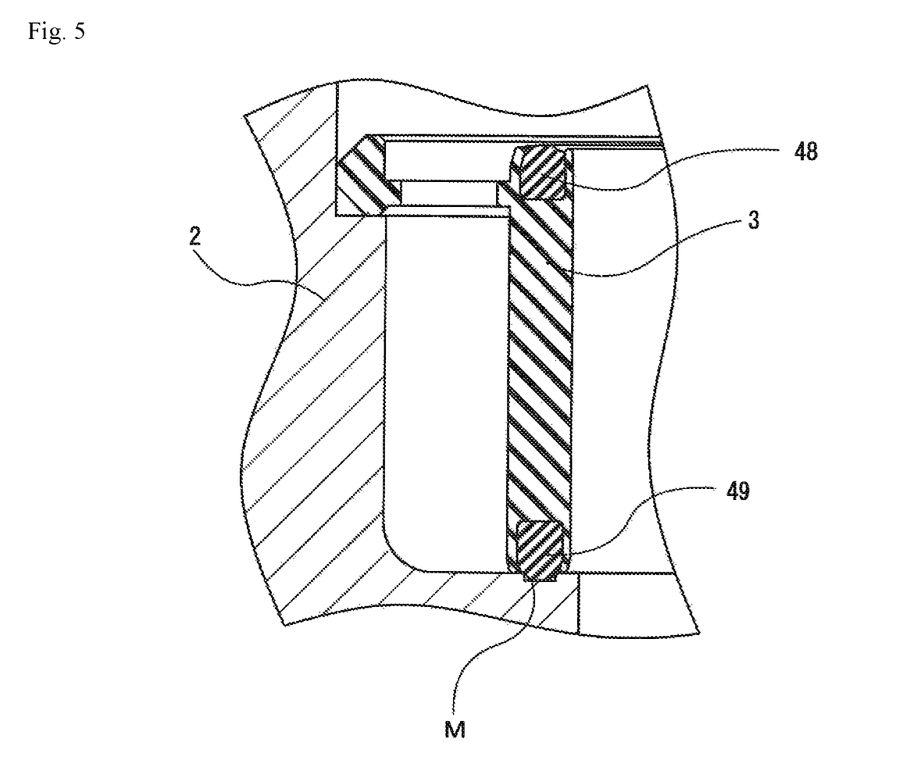
FIG. 5 is a partial sectional view illustrating a case where a groove housing a disc seal is formed in an arranged position of the inner disc in a valve body.

The valve seat 48 may be fixed by swaging in the valve seat recessed part 35, or the like. Further, the disc seal 49 may be fixed by swaging in the disc seal recessed part 36, or the like. With the valve seat 48 and the disc seal 49 thus fixed to the inner disc 3, it is possible to prevent displacement during assembly and during operation, and further simplify the manufacturing process. In particular, with the disc seal 49 fixed to the inner disc 3, there is no need to form a groove or the like for positioning the disc seal 49 to the valve body 2, further simplifying the positioning task during assembly as well, and thus making it possible to further reduce manufacturing costs and improve yield. Further, as illustrated in the partial sectional view of FIG. 5, the valve body 2 may include a groove M for disposing the disc seal 49. When high-temperature fluid is introduced, a contact area between the fluid and the disc seal 49 is minimized by forming the groove M in the valve body 2, making it possible to suppress expansion of the disc seal 49 caused by heating. Further, the disc seal 49 is housed in the groove M and a lower end of the inner disc 3 comes into contact with the valve body 2, separating the inner side and the outer side of the inner disc 3, making it possible to accurately define a height of the valve seat 48. In addition, even if the disc seal 49 is expanded, a volume of the expanded disc seal 49 is kept within the groove M, making it possible to prevent the inner disc 3 from rising while securing a seal performance, and stably hold the height of the valve seat 48. Thus, the seal on the valve body 2 side of the inner disc 3 is made more reliable by the disc seal 49, allowing the valve device 1 to control a high flow rate in a more stable manner.

The valve seat 48 and the disc seal 49 may be made of a synthetic resin (such as perfluoroalkoxy alkane (PFA), polyamide (PA), polyimide (PI), or polychlorotrifluoroethylene (PCTFE)). Further, the valve seat 48 may be made of the same material and have the same shape as the disc seal 49. That is, the valve seat 48 and the disc seal 49 may be obtained by attaching the same parts vertically in reverse. As a result, the parts can be made common, making it possible to reduce product costs.

The diaphragm 41 closes the first opening 33 that extends from the first flow path 21 of the valve body 2 to make the first flow path 21 and the second flow path 22 discontinuous, and opens the first opening 33 to make the first flow path 21 and the second flow path 22 continuous. The diaphragm 41 is arranged above the valve seat 48, holds an airtightness of the valve chamber 23, and makes the first flow path 21 and the second flow path 22 continuous or discontinuous by a central part thereof moving up and down and being brought into contact with and separating from the valve seat 48. According to one or more embodiments, the diaphragm 41 is obtained by swelling central parts of a thin plate made of a metal such as a special stainless steel, and a nickel and cobalt alloy thin plate upward, and thus has a spherical shell shape in which an upwardly convex arc shape is the natural state. The diaphragm 41 is formed in an elastically deformable manner into a spherical shell shape by a metal such as stainless or a NiCo-based alloy, or a fluorine-based resin, for example.

The diaphragm 41, at the peripheral edge part thereof, is mounted on the outer annular part 31 of the inner disc 3, and a lower end part of the bonnet 5 inserted into the valve chamber 23 is screwed into the screw hole 25 of the valve body 2, thereby pressing the diaphragm 41 to the outer annular part 31 side of the inner disc 3 via the pressing adapter 43 made of a stainless alloy, for example, and sandwiching and fixing the diaphragm 41 in an airtight state. That is, the diaphragm 41 is fixed by sandwiching a peripheral edge part thereof between the pressing adapter 43 and the outer annular part 31. It should be noted that, as the diaphragm 41, a diaphragm having another configuration can also be used. Here, the diaphragm 41 may be a dome type in which a curve forming a curved surface has no inflection point in a natural state. "A curve forming a curved surface has no inflection point" refers to, for example, a curve having no inflection point in a case where there is a curve forming a curved surface of the diaphragm 41 by rotation. "Has no inflection point" is the same meaning as no change in the sign of the curvature. With the diaphragm 41 thus having a dome type, it is possible to increase the distance from the valve seat 48 in the open position and make the flow path larger, making it possible to increase the flow rate.

Figure 6:
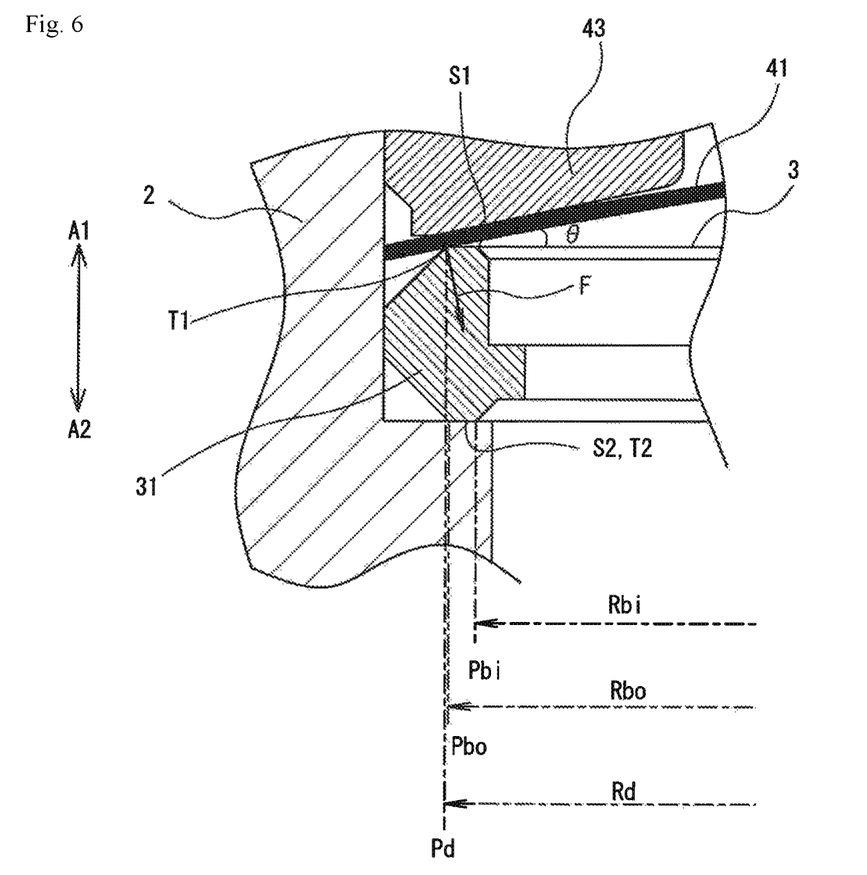
FIG. 6 is an enlarged sectional view for explaining an outer annular part.

FIG. 6 is an enlarged sectional view for explaining the outer annular part 31. Here, the diaphragm 41 is described using the case of the aforementioned dome type. As illustrated in FIG. 6, when the diaphragm 41 is a dome type, the diaphragm 41 has an angle θ relative to a surface orthogonal to the upward and downward directions A1, A2, even at an edge part thereof. Thus, the diaphragm 41 comes into contact at a corner part of the outer annular part 31, and a force F is applied to the outer annular part 31 in an oblique inward direction from the diaphragm 41 in this contact portion. Here, the surface of the outer annular part 31 that comes into contact with the diaphragm 41 is a diaphragm contact surface T1. According to one or more embodiments, an outermost position Pd of the diaphragm contact surface T1 is on an outer side of an innermost position Pbi of a body contact surface T2 where the outer annular part 31 comes into contact with the step part 24 of the valve body 2. Here, the terms "outer side" and "inner side" are based on the center line CL of the outer annular part 31 and the inner annular part 32. Further, the body contact surface T2 is a surface orthogonal to an axial direction, which is the direction in which the center line CL extends, and is a support surface.

Figure 7:
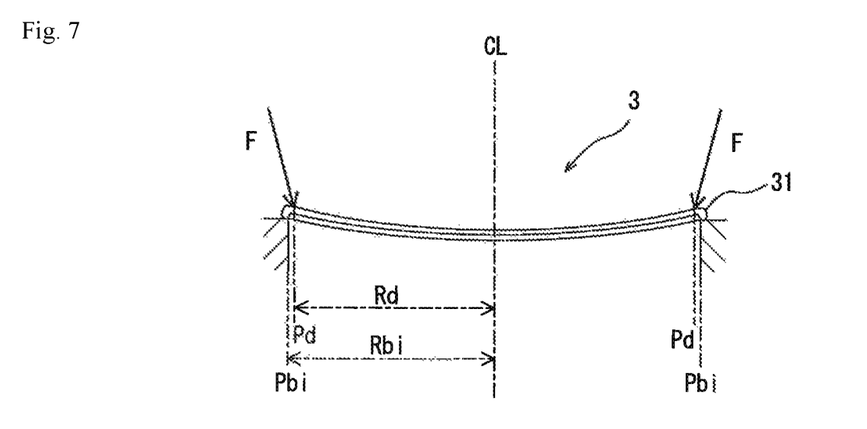
FIG. 7 is an outline drawing for explaining how the force is applied from the diaphragm in the inner disc.
Figure 8:
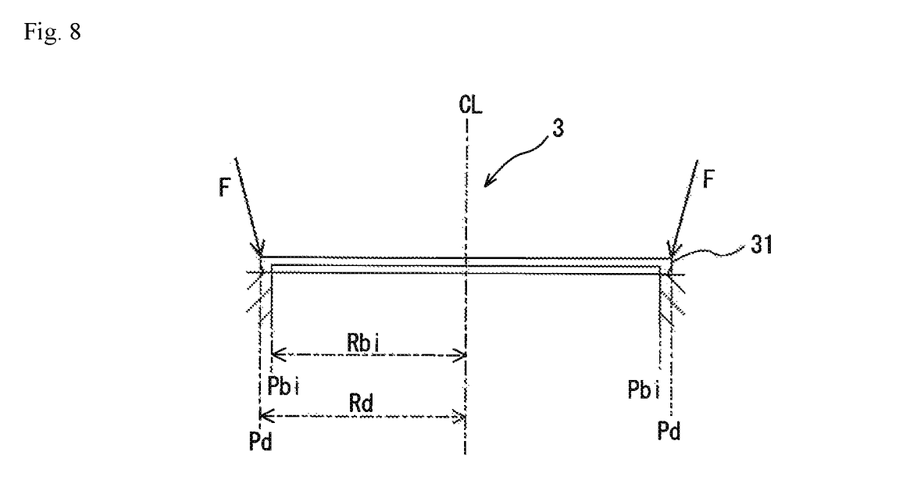
FIG. 8 is an outline drawing for explaining how the force is applied from the diaphragm in the inner disc.

FIG. 7 is an outline drawing for explaining how the force F from the diaphragm 41 is applied when the outermost position Pd of the diaphragm contact surface T1 is on an inner side of the innermost position Pbi of the body contact surface T2. FIG. 8 is an outline drawing for explaining how the force from the diaphragm 41 is applied when the outermost position Pd of the diaphragm contact surface T1 is on an outer side of the innermost position Pbi of the body contact surface T2. As illustrated in FIG. 7, when the outermost position Pd of the diaphragm contact surface T1 is on the inner side of the innermost position Pbi of the body contact surface T2, and the force F is applied in the oblique inward direction from the diaphragm contact surface T1, the force F acts as a bending force so that the central portion of the inner disc 3 sinks. Such a force may affect the securing of airtightness by the inner disc 3 inside the valve device 1, or the durability of the inner disc 3 itself.

On the other hand, even when the outermost position Pd of the diaphragm contact surface T1 is on the outer side of the innermost position Pbi of the body contact surface T2 as illustrated in FIG. 6 and the force F is applied in the oblique inward direction as illustrated in FIG. 8, the outer annular part 31 receives the force between the outer annular part 31 and the valve body 2, making it possible to suppress a force that deforms the inner disc 3. Here, the outermost position Pd of the diaphragm contact surface T1 may be on an outer side of an outermost position Pbo of the body contact surface T2. In this case, the outer annular part 31 can receive the force F in a more oblique inward direction, making it possible to further suppress deformation of the inner disc 3. Accordingly, with such a configuration, the valve device 1 can control a high flow rate in a more stable manner.

Further, back to FIG. 6, with a focus on the cross-sectional shape of the outer annular part 31, the cross-sectional shape of the outer annular part 31 includes a surface S1 on the diaphragm side, and a surface S2 on the valve body side, which are surfaces opposite from each other. A radius Rd of a circle formed by an outer edge of, among the surface S1 on the diaphragm side and the surface S2 on the valve body side, the surface S1 on the diaphragm side is formed greater than a radius Rbi of a circle formed by an inner edge of the surface S2 on the valve body side. In such a configuration, even when the force F is applied in the oblique inward direction, the outer annular part 31 receives the force between the outer annular part 31 and the valve body 2, making it possible to suppress deformation of the inner disc 3.

Here, the radius Rd of a circle formed by an outer edge of, among the surface S1 on the diaphragm side and the surface S2 on the valve body side, the surface S1 on the diaphragm side may be formed greater than a radius Rbo of a circle formed by an outer edge of the surface S2 on the valve body side. In this case, the outer annular part 31 can receive the force F in a more oblique inward direction, making it possible to further suppress deformation of the inner disc 3. Accordingly, with such a configuration, the valve device 1 can control a high flow rate in a more stable manner.

Figure 9:
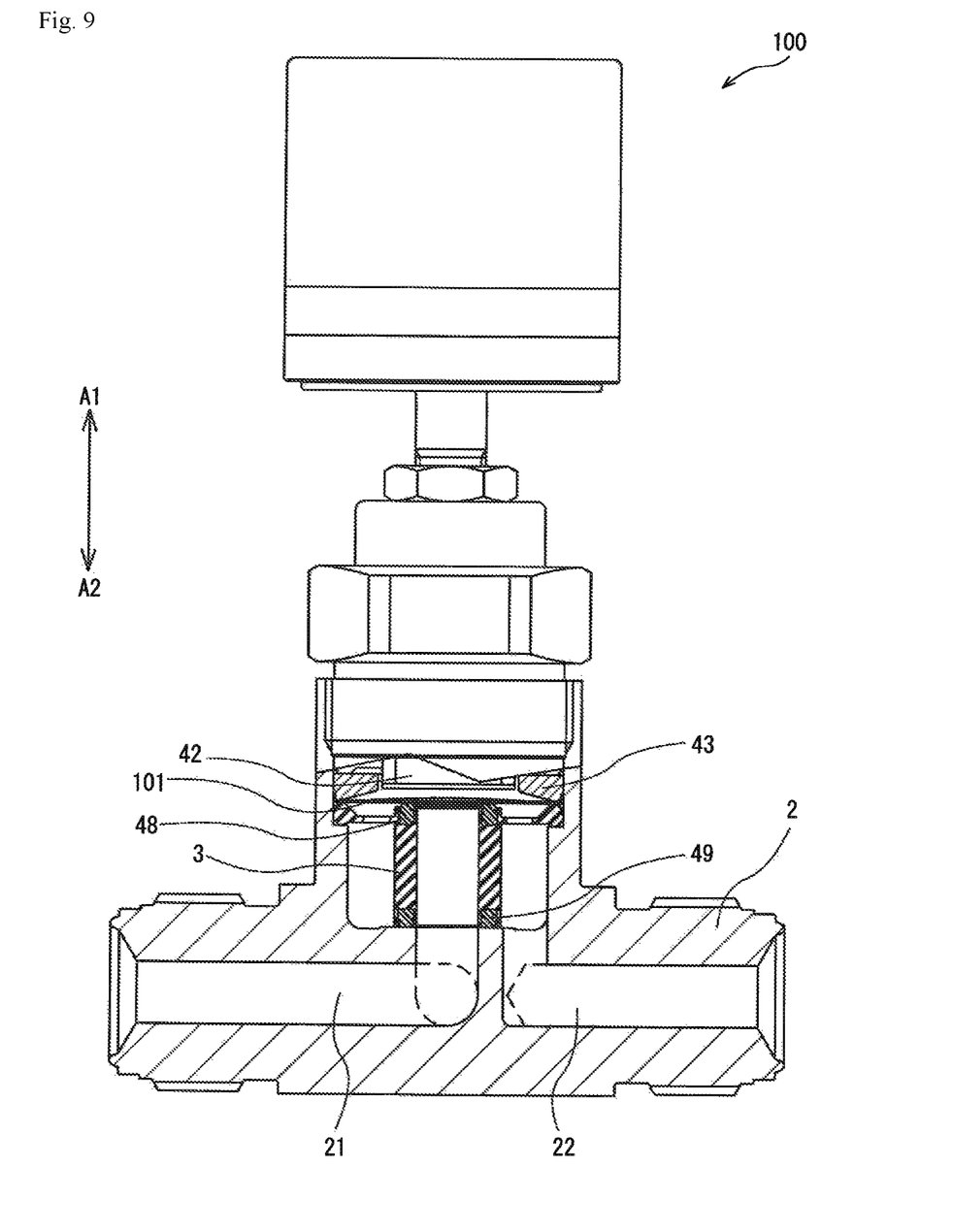
FIG. 9 is a partial sectional view illustrating another valve device.

FIG. 9 is a partial sectional view illustrating another valve device 100. The valve device 100 is an automatic valve device that controls the valve element by compressed air for high temperatures. In the description of FIG. 9, the corresponding sections of the valve device 1 in FIGS. 1 and 2 are denoted using the same reference signs, and descriptions thereof are omitted. In FIG. 9, a diaphragm 101, unlike the case of FIGS. 1 and 2, is a hat type in which a curve forming a curved surface in the open position has an inflection point. In the diaphragm 101 on the hat side, a peripheral edge part of the diaphragm 101 sandwiched between the outer annular part 31 and the pressing adapter 43 is a surface substantially orthogonal to the upward and downward directions A1, A2.

Figure 10:
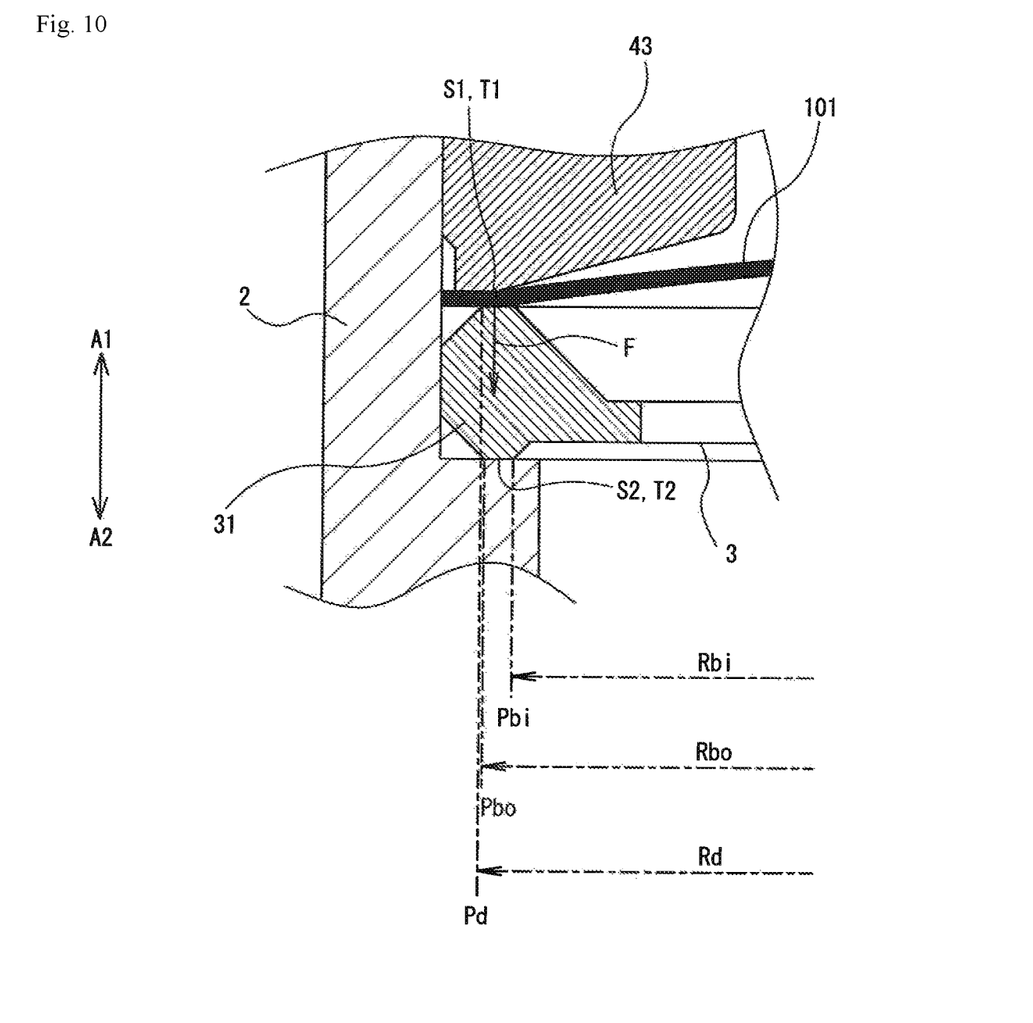
FIG. 10 is an enlarged sectional view for explaining the outer annular part of a hat-type diaphragm.

FIG. 10 is an enlarged sectional view for explaining the outer annular part 31 of the hat-type diaphragm 101. As mentioned above, the peripheral edge part of the diaphragm 101 sandwiched between the outer annular part 31 and the pressing adapter 43 extends in a substantially orthogonal direction to the upward and downward directions A1, A2. In this case as well, as described in FIGS. 7 and 8, when the outermost position Pd of the diaphragm contact surface T1 is on the inner side of the innermost position Pbi of the body contact surface T2, the force F from the diaphragm contact surface T1 acts as a bending force so that the central portion of the inner disc 3 sinks. Accordingly, in the same way as described in FIG. 6, when the outermost position Pd of the diaphragm contact surface T1 is on the outer side of the innermost position Pbi of the body contact surface T2, deformation of the inner disc 3 can be suppressed. Further, the outermost position Pd of the diaphragm contact surface T1 in which the outer annular part 31 comes into contact with the diaphragm 101 may be on an outer side of the outermost position Pbo of the body contact surface T2 where the outer annular part 31 comes into contact with the valve body 2. In this case, the outer annular part 31 can receive the force F further on the inner side, making it possible to further suppress deformation of the inner disc 3. Accordingly, with such a configuration, the valve device 100 can control a high flow rate in a more stable manner.

Further, in the same way as in FIG. 6, the radius Rd of the circle formed by the outer edge of, among the surface S1 on the diaphragm side and the surface S2 on the valve body side, the surface S1 on the diaphragm side may be formed greater than the radius Rbi of the circle formed by the inner edge of the surface S2 on the valve body side. In this case as well, the outer annular part 31 receives the force between the outer annular part 31 and the valve body 2, making it possible to suppress deformation of the inner disc 3. Further, the radius Rd of the circle formed by the outer edge of, among the surface S1 on the diaphragm side and the surface S2 on the valve body side, the surface S1 on the diaphragm side may be formed greater than the radius Rbo of the circle formed by the outer edge of the surface S2 on the valve body side. In this case, the outer annular part 31 can receive the force F further on the inner side, making it possible to further suppress deformation of the inner disc 3. Accordingly, with such a configuration, the valve device 100 can control a high flow rate in a more stable manner.

Next, an application example of the valve device 1 described above will be described with reference to FIG. 11.

Figure 11:
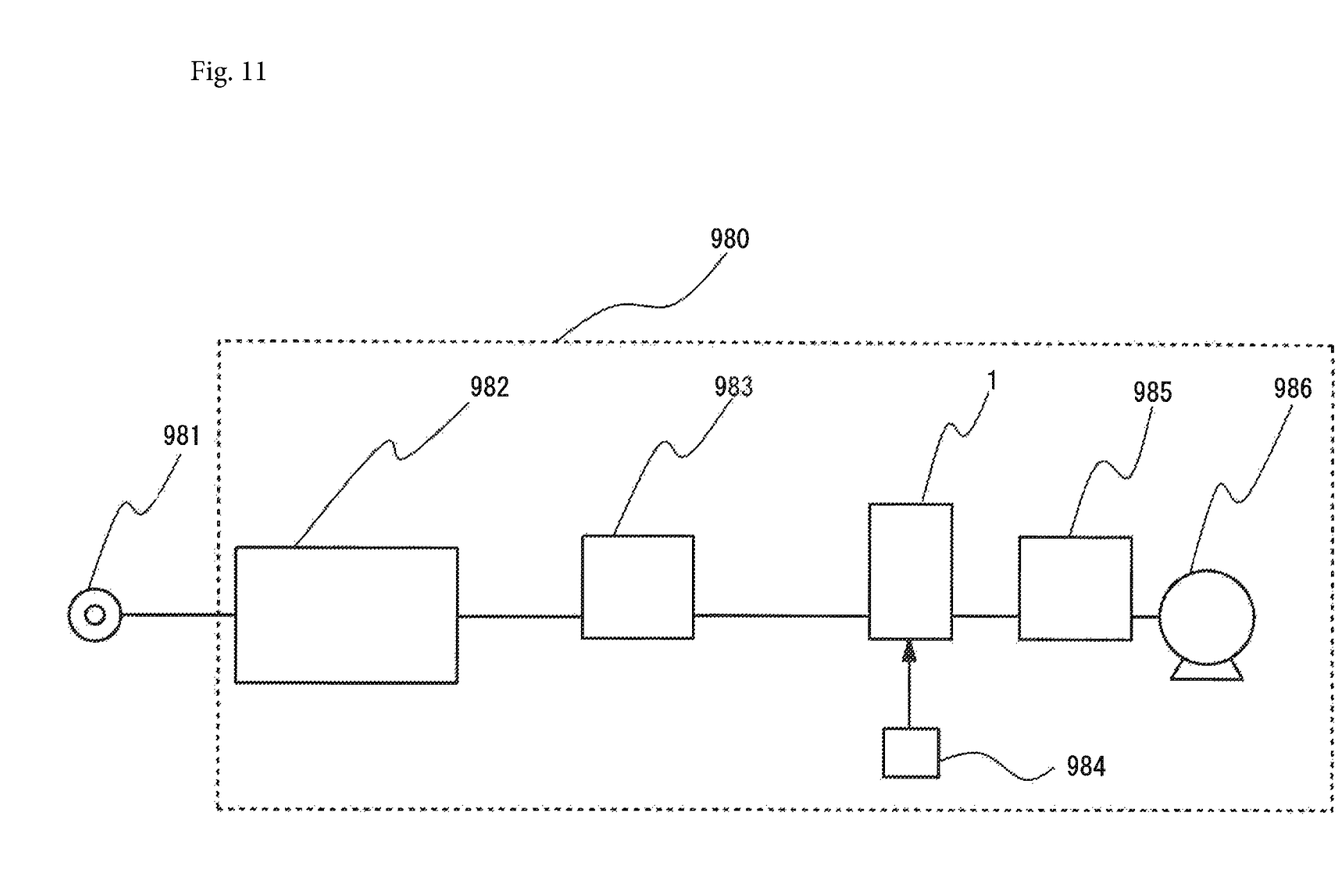
FIG. 11 is a schematic diagram illustrating an example of applying the valve device according to one or more embodiments of the present invention to a semiconductor manufacturing process.

A semiconductor manufacturing system 980 illustrated in FIG. 11 is a system for executing a semiconductor manufacturing process by the ALD method, with 981 denoting a process gas supply source, 982 denoting a gas box, 983 denoting a tank, 984 denoting a control unit, 985 denoting a processing chamber, and 986 denoting an exhaust pump.

In the semiconductor manufacturing process based on the ALD method, the flow rate of the process gas needs to be precisely adjusted and secured to a certain extent by increasing a size of a diameter of the substrate.

The gas box 982 is an integrated gas system (a fluid control system) in which various fluid control devices, such as a switch valve, a regulator, and a mass flow controller, are integrated and housed in a box to supply an accurately measured process gas to the processing chamber 985.

The tank 983 functions as a buffer for temporarily storing the process gas supplied from the gas box 982.

The control unit 984 controls flow adjustment by controlling the supply of the operation gas to the valve device 1.

The processing chamber 985 provides a sealed treatment space for forming a film on the substrate by the ALD method.

The exhaust pump 986 draws a vacuum inside the processing chamber 985.

According to such a system configuration as described above, initial adjustment of the process gas is possible as long as a directive for flow adjustment is sent from the control unit 984 to the valve device 1.

It should be noted that the present invention is not limited to the aforementioned embodiments. Those skilled in the art can make various additions and modifications within the scope of the present invention. For example, while a case where the valve device 1 is used in a semiconductor manufacturing process based on the ALD method is illustrated in the above-described application example, the present invention is not necessarily limited thereto, and can be applied to various targets that require precise flow adjustment, such as an atomic layer etching (ALE) method, for example.

While a piston built into a cylinder activated by gas pressure is used as the actuator in the above-described embodiments, the present invention is not necessarily limited thereto, and optimal actuators can be variously selected in accordance with the control target.

While, in the configuration of the above-described embodiments, the valve device 1 is disposed outside the gas box 982 serving as a fluid control system, the valve device 1 of the above-described embodiments can also be included in a fluid control system that integrates and houses various fluid devices such as a switch valve, a regulator, and a mass flow controller in a box.

While the valve device is mounted on the plurality of flow path blocks 992 as a fluid control system illustrated in the above-described embodiments, in addition to the divided-type flow path block 992, the valve device of the present invention can also be applied to an integrated flow path block and a base plate.

REFERENCE NUMERALS LIST

1 Valve device
2 Valve body
2a Upper surface
2b Side surface
2c Side surface
3 Inner disc
5 Bonnet
5a Upper surface
6 Casing
6a Upper surface
7 Operating member
8 Actuator
21 First flow path
22 Second flow path
23 Valve chamber
24 Step part
25 Screw hole
31 Outer annular part
32 Inner annular part
33 First opening
34 Second opening 35 Valve seat recessed part
36 Disc seal recessed part
37 Connecting part
41 Diaphragm
42 Diaphragm presser
43 Pressing adapter
44 Stem
45 Coil spring
48 Valve seat
49 Disc seal
54 Circular hole
61 Operation gas supply port
62 Ventilation path
64 Circular hole
65 Connecting member
71 Operating member flow channel
81 Piston
82 Bulkhead
83 Cylinder
91 O-ring
100 Valve device
101 Diaphragm
980 Semiconductor manufacturing system
981 Process gas supply source
982 Gas box
983 Tank
984 Control unit
985 Processing chamber
986 Exhaust pump
991A Switch valve
991B Regulator
991C Pressure gauge
991D Switch valve
991E Mass flow controller
992 Flow path block
993 Introducing pipe
A1 Upward direction
A2 Downward direction
BS Base plate
CL Center line
F Force
G1 Longitudinal direction (upstream side)
G2 Longitudinal direction (downstream side)
M Groove
Rbi, Rbo, Rd Radius
S1 Surface on diaphragm side
S2 Surface on valve body side
T1 Diaphragm contact surface
T2 Body contact surface
W1, W2 Width direction
θ Angle Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A valve device comprising:
   a valve body that forms a first flow path and a second flow path;
   an inner disc that includes:
      an inner annular part disposed around an opening of the first flow path;
      an outer annular part disposed on an outer peripheral side of the inner annular part; and
      a connecting part that:
         comprises a plurality of openings that communicates with the second flow path, and
         connects the inner annular part and the outer annular part;
   a valve seat disposed on the inner annular part;
   a diaphragm that:
      comprises a peripheral edge part that contacts the outer annular part, and
      moves between an open position and a closed position, wherein
         in the open position, the diaphragm does not contact the valve seat, and the first flow path and the second flow path are continuous, and
         in the closed position, the diaphragm contacts the valve seat, and the first flow path and the second flow path are discontinuous;
   a pressing adapter that sandwiches the peripheral edge part with the outer annular part and that contacts the peripheral edge part; and
   a disc seal that is disposed between the inner annular part and the valve body and that is held in a disc seal groove, wherein
   the outer annular part comprises:
      a diaphragm contact surface that contacts the diaphragm; and
      a body contact surface that contacts a surface of the valve body, wherein
      an outermost position of the diaphragm contact surface is on an outer side of an outermost position of the body contact surface, and
   the disc seal groove is disposed on a valve body side of the inner annular part.

2. The valve device according to claim 1, wherein the diaphragm is dome-shaped with a curved surface that has no inflection point in the open position.

3. The valve device according to claim 1, wherein:
   the inner annular part includes a valve seat groove disposed on a diaphragm side of the inner annular part, and
   the valve seat is:
      held in the valve seat groove,
      made of a same material as the disc seal, and
      a same shape as the disc seal.

4. The valve device according to claim 1, wherein the inner annular part:
   has a tubular shape longer than the outer annular part in a direction of extension of a center line of the inner disc, and
   communicates:
      with the first flow path on an inner side of the inner annular part, and
      with the second flow path on an outer side of the inner annular part.

5. A fluid control system comprising a plurality of fluid devices that is arranged from an upstream side toward a downstream side and that includes the valve device of claim 1.

6. A valve device comprising:
   a valve body that forms a first flow path and a second flow path;
   an inner disc that includes:
      an inner annular part disposed around an opening of the first flow path;
      an outer annular part disposed on an outer peripheral side of the inner annular part; and a connecting part that:
: comprises a plurality of openings that communicates with the second flow path, and
: connects the inner annular part and the outer annular part;

a valve seat disposed on the inner annular part;

a diaphragm that:
: comprises a peripheral edge part that contacts the outer annular part, and
: moves between an open position and a closed position, wherein
:: in the open position, the diaphragm does not contact the valve seat, and the first flow path and the second flow path are continuous, and
:: in the closed position, the diaphragm contacts the valve seat, and the first flow path and the second flow path are discontinuous;

a pressing adapter that sandwiches the peripheral edge part with the outer annular part and that contacts the peripheral edge part; and a disc seal that is disposed between the inner annular part and the valve body and that is held in a disc seal groove, wherein the outer annular part comprises:
: a diaphragm side surface; and
: a valve body side surface that is opposite the diaphragm side surface, wherein
:: a radius of a circle formed by an outer edge of the diaphragm side surface is greater than a radius of a circle formed by an outer edge of the valve body side surface, and
:: the disc seal groove is disposed on a valve body side of the inner annular part.

7. A flow control method for adjusting a flow rate of a fluid using the valve device of claim 1.

8. A semiconductor manufacturing system comprising the valve device of claim 1 for control of a process gas in a manufacturing process of a semiconductor device that requires a treatment process by the process gas in a sealed chamber.

9. A semiconductor manufacturing method comprising a step of using the valve device of claim 1 for flow control of a process gas in a manufacturing process of a semiconductor device that requires a treatment process by the process gas in a sealed chamber.

10. A fluid control system comprising a plurality of fluid devices that is arranged from an upstream side toward a downstream side and that includes the valve device of claim 6.

11. A flow control method for adjusting a flow rate of a fluid using the valve device of claim 6.

12. A semiconductor manufacturing system comprising the valve device of claim 6 for control of a process gas in a manufacturing process of a semiconductor device that requires a treatment process by the process gas in a sealed chamber.

13. A semiconductor manufacturing method comprising a step of using the valve device of claim 6 for flow control of a process gas in a manufacturing process of a semiconductor device that requires a treatment process by the process gas in a sealed chamber.

* * * * *